United States Patent [19]
Pickles et al.

[11] 3,893,206
[45] July 8, 1975

[54] SEAT RECLINING ASSEMBLY

[75] Inventors: Joseph Pickles, Birmingham; Chester S. Fudala, Detroit, both of Mich.

[73] Assignee: Ferro Manufacturing Corporation, Detroit, Mich.

[22] Filed: Apr. 10, 1974

[21] Appl. No.: 459,632

[52] U.S. Cl. .............................................. 16/144
[51] Int. Cl. ........................................... E05d 11/10
[58] Field of Search ............ 16/139, 140, 142, 144, 16/145, 146; 403/59, 61, 52, 79, 80, 83, 84, 105

[56] References Cited
UNITED STATES PATENTS

| | | | |
|---|---|---|---|
| 3,562,851 | 2/1971 | Koller | 16/140 |
| 3,823,440 | 7/1974 | Klingelhofer | 16/139 |
| 3,849,834 | 11/1974 | Mayer | 16/145 |

*Primary Examiner*—Geo. V. Larkin
*Attorney, Agent, or Firm*—Whittemore, Hulbert and Belknap

[57] ABSTRACT

A seat reclining assembly in which the seat back is movable from an upright position forwardly and rearwardly to limiting positions including planetary gearing including a gear rotatable as a consequence of swinging movement of said seat back, and releasable pawl mechanism engageable to lock the seat back in any predetermined position.

19 Claims, 5 Drawing Figures

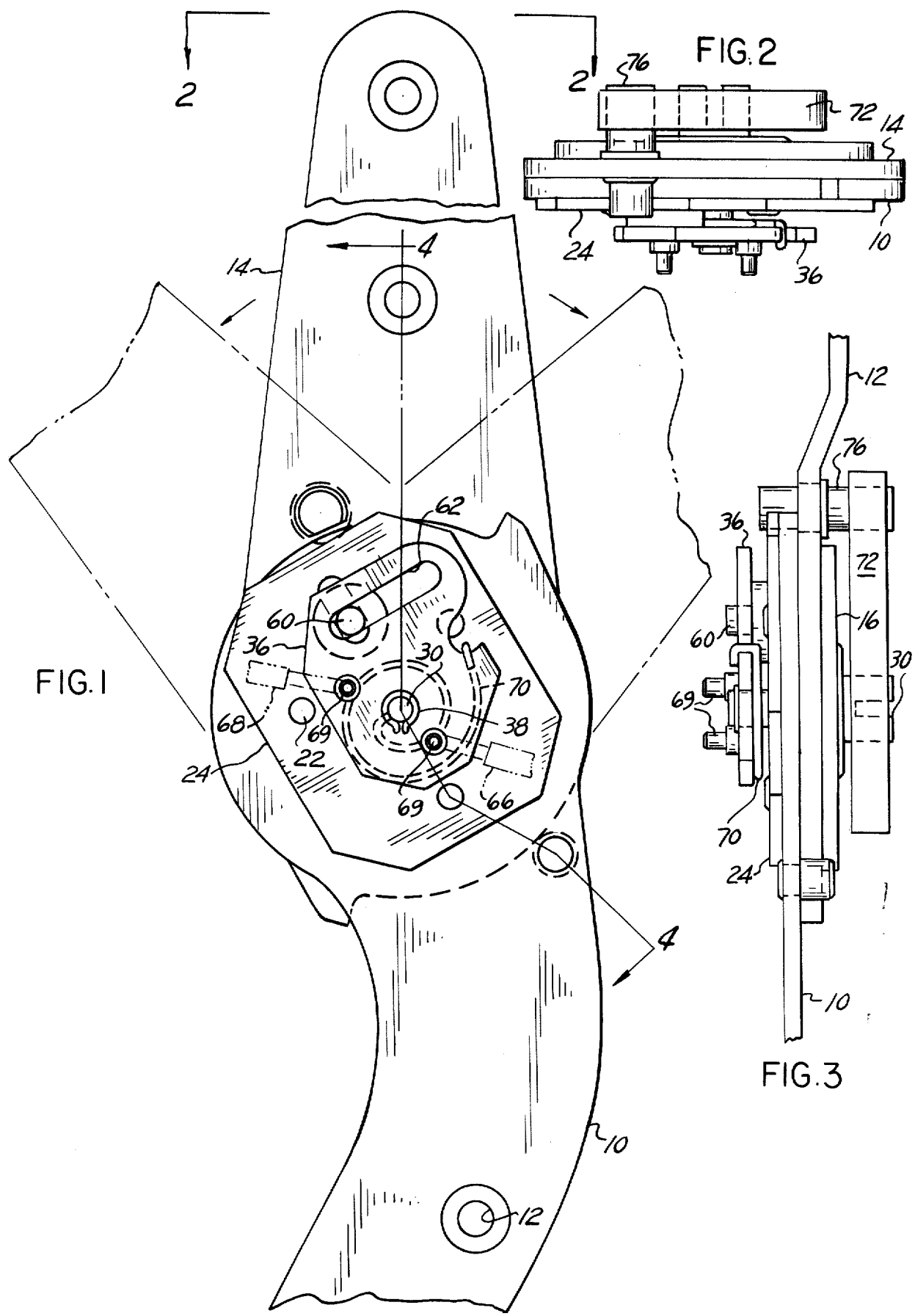

FIG. 4
FIG. 5
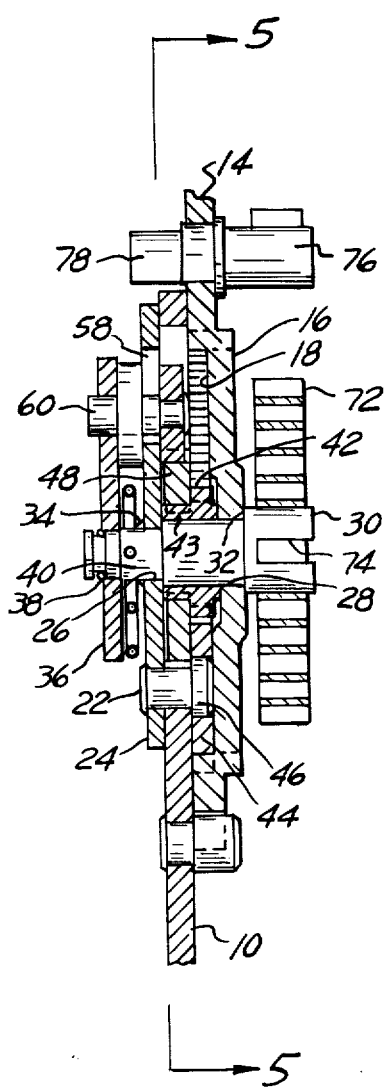
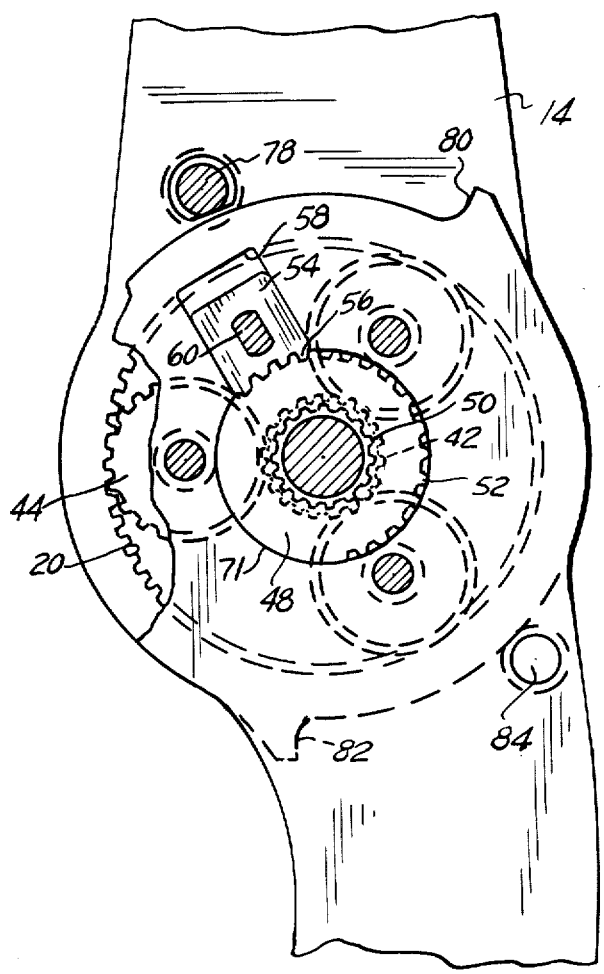

3,893,206

SEAT RECLINING ASSEMBLY

BRIEF SUMMARY OF THE INVENTION

The seat reclining assembly may be used in different environments but it is particularly useful as front seat assembly for automotive vehicles and particularly for two-door vehicles which call for forward tilting movement of the seat back to facilitate movement of a passenger into and out of the back seat.

In accordance with the present invention, the construction is associated with elements which are pivoted together and which are rigidly attached respectively to a vehicle seat and a seat back. The vehicle seat may be stationary or it may be mounted for fore and aft adjustment, or it may be mounted for additional movement for example as vertical adjustment and/or a tilting adjustment. While the amount of adjustability provided for the seat back may be as desired, it is illustrated herein as providing approximately 45° in both a forward and rearward direction.

Releasable latch means are provided effective to hold the seat back in any desired position of adjustment, the latch mechanism being releasable from two remote positions, such for example as an actuator located convenient to an occupant of the front seat of the vehicle, and a position convenient to an occupant of the rear seat of the vehicle.

The latch mechanism employs planetary gearing including a sun gear, an internal gear concentric with the sun gear, and a plurality of planet gears in mesh simultaneously with the sun gear and with the internal gear. In the planetary gear set one of the concentric gears; that is, either the ring gear or the sun gear, is mounted for free rotation and is adapted to be driven in a high ratio manner by the planetary gearing as the seat back is tilted relative to the seat. Ratchet means is associated with the freely rotatable gear and comprises a ratchet rotatable therewith and a pawl movable radially of the ratchet into and out of locking position relative thereto. When the pawl is in locking position the planetary gear is locked and hence the seat back is retained in precisely adjusted position. Since the freely rotatable gear is driven in a high ratio relationship, the pawl may lock the seat back at substantially any adjusted position within its range of movement. Moreover, as a further consequence the pawl locks the seat back against movement by extraneous force applied directly thereto. Thus, in the case of impact, the seat back will not be impelled in either direction from its locked position, and furthermore, the occupant of the rear seat cannot push the seat back forwardly without releasing the locking mechanism.

FIG. 1 is a side view showing the seat mount, the seat back mount, and the release cam in assembled relation.

FIG. 2 is a plan view of the mechanism of FIG. 1 looking in the direction of the arrows 2—2, FIG. 1.

FIG. 3 is a fragmentary elevational view.

FIG. 4 is a sectional view on the line 4—4, FIG. 1.

FIG. 5 is a sectional view on the line 5—5, FIG. 4.

DETAILED DESCRIPTION

The construction illustrated in the Figures shows a seat mount and a seat back mount pivoted together and it is of course to be understood that these mounts are respectively fixedly connected to a seat frame and a seat back frame. Similar mounts are provided at both sides of the seat although preferably, the locking mechanism disclosed herein is applied to only one of the pair of mounts. However, it is within the contemplation of the present invention that locking mechanism may, if considered desirable, be provided at both sides of the seat and associated with operating devices such that both sets of mounts are locked and unlocked simultaneously.

Referring to the drawings in detail, a seat mount 10 is provided which is formed of flat stock which conveniently may have a thickness of somewhat less than 0.20 inches. The mount is provided with a plurality of openings one of which is indicated at 12 by means of which the seat frame may be fixedly secured thereto.

Pivotally connected to the seat mount is a seat back mount 14 which may conveniently be formed of flat stock identical with that used in fabricating the seat mount. While the seat mount remains flat in its entirety, the seat back mount contains a partially sheared and laterally displaced portion 16 arranged to provide a generally circular pocket or recess 18 provided with a circular series of teeth 20 constituting the internal gear of a planetary gear set. Except for this partially sheared and displaced portion, the seat back mount 14 remains flat in its entirety.

Fixedly secured as by rivets 22 to the seat mount 10 is a cover plate 24 which may conveniently be formed from flat stock of the same thickness as employed in fabrication of the seat mount and the seat back mount.

In order to provide a pivot connection between the seat mount 10 and the seat back mount 14, the cover 24 is provided with an opening 26 and the seat back mount 14 is provided with an opening 28, and in these aligned openings there is received a pivot stud 30. The head of the stud 30 bears against the outer surface of the displaced portion 16 of the seat back frame as indicated at 32. At its opposite end the stud 30 is staked as indicated at 34 against the outer surface of the cover 24 to provide a permanent interconnection between the seat mount 10 and the cover 24 on the one hand and the seat back mount 14 on the other. Beyond the staked portion 34 the stud 30 receives a release lever 36 (subsequently to be described) which is retained in place by a releasable retainer ring 38. The opening 26 in the cover 24 is elongated and provided with flat sides and the portion 40 of the stud 30 is correspondingly flattened so that the stud is retained against rotation in the assembly.

Mounted for free rotation on an intermediate portion of the stud is a freely rotatable sun gear 42. Received within the recess or pocket 18 and in simultaneous mesh with the internal gear 20 and with the sun gear are a plurality (here designated as three) of planet gears 44. Each of the planet gears has a central opening which receives the head 46 of one of the rivets 22 which secure the cover 24 to the seat mount 10. Inasmuch as the seat mount 10 may remain stationary during angular tilting movement of the seat back mount 14, and since the cover 24 is rigidly affixed by riveting to the seat mount, the planet gears 44 remain in fixed position and rotation of the internal gear 20, as a consequence of tilting movement of the seat back mount 14, imparts rotation to the freely rotatable sun gear 42.

The portion of the freely rotatable sun gear which extends to the left of planet gears 44 (as viewed in FIG. 4) constitutes a spline 43 in which is received a correspondingly splined ratchet 48, the spline teeth on the ratchet being indicated at 50 and the ratchet teeth being indicated at 52.

From an inspection of FIG. 5 it will be observed that rotation of the ring gear 20 which is formed as a part of the seat back mount 14, will apply rotation to the planet gears 44 and this in turn will apply a high ratio rotation to the sun gear 42 and the ratchet 48 fixed to the sun gear for rotation therewith.

Locking means are provided for movement into and out of locking position relative to the ratchet and this locking means comprises a pawl 54 having teeth 56 adapted to enter into engagement with the teeth 52 of the ratchet. The pawl is radially moved with respect to the axis of the ratchet in an elongated flat sided slot 58 formed in the cover 24. In order to effect movement of the pawl 54 into and out of the locking position illustrated in FIG. 5, it is provided with an elongated rivet 60 which extends through the elongated slot 58 and through a cam slot 62 provided in the release lever 36. The release lever 36, as previously described, is pivotally connected to the stud 30 and is diagrammatically illustrated as connected to two remote actuators 66 and 68 connected to pins 69 on lever or cam 36, which may take the form of bowden wire actuators, one available for operation from the front seat of the vehicle and the other from the rear seat. The lever 36 is provided with a torsion spring 70 biasing it clockwise as seen in FIG. 1, or to the locking position of the lever 36 and pawl 54. When the lever is rotated counterclockwise the inclination of the cam slot 62 is such that it will cam the rivet 60 and hence, the associated pawl 54 radially outwardly from the ratchet 48. When the pawl is released from the ratchet, the seat back may be moved forwardly or rearwardly into adjusted position, after which the release lever actuator may be released at which time the spring 70 restores the lever 36 to locking position.

As best illustrated in FIG. 5, the ratchet 48 is provided with teeth throughout an arc somewhat greater than 180°, the remainder of the periphery of the ratchet gear being a smooth cylindrical surface. The arrangement is such that pawl 54 can engage teeth in ratchet 48 throughout an arc of 180° movement thereof.

With the parts as illustrated in FIG. 5 it will be assumed that the seat back is in its upright position and the teeth 56 of the pawl 54 are engaging in the tooth spaces next adjacent to the smooth cylindrical surface portion 71 of the ratchet 48. If now, the seat back is swung forwardly or counterclockwise to the left as viewed in FIG. 5, this will drive the planetary gearing to rotate the ratchet gear 48 clockwise and the first limited clockwise rotation of the ratchet gear will bring an end tooth 56 of the pawl into position to engage the smooth cylindrical surface of the ratchet gear upon radial inward movement of the pawl. Accordingly, as the seat back is moved forwardly to provide access to the rear seat, the locking mechanism is disabled since the pawl is out of registration with the toothed portion of the ratchet.

When the seat back is swung forwardly from the upright position, in order to provide access to the rear seat of a two-door vehicle, the smooth or untoothed peripheral surface 71 of the ratchet 48 lies beneath the pawl 54. Accordingly, the seat back cannot be latched in its forward position and if the camming lever 36 is released after the seat back has been moved slightly forwardly from its vertical position, the torsion spring 70 will urge the pawl 54 radially inwardly to bear against the smooth cylindrical surface. However, at this time the angularity of the portion of the slot 62 occupied by the pin 60 is such that no substantial frictional resistance will be opposed to forward or reverse swinging movement of the seat back. After the occupant of the rear seat has passed through the door, the seat back may be swung against the action of a balance spring 72 to upright position, at which time the pawl 54 will be permitted to move into engagement with ratchet teeth and thus to lock or latch the seat back in upright position.

Attention is also directed to the fact that the cam slot 62 is so arranged that when the pawl is fully engaged with the ratchet, a condition illustrated in FIG. 1, the cam follower pin or rivet is located near the left hand end of the composite slot 62. The slot extends at right angles to a radial line drawn from the main pivot provided by the stud 30. With this arrangement any forces applied directly to the seat back, while latched, tending to drive the planetary gearing and so to release the pawl, are ineffective since forces applied to the pawl from the ratchet, tending to move the pawl radially outwardly, are applying forces to the outer side of the slot portion 62 normal to this surface and hence, ineffective to induce rotation.

On the other hand, when the release lever 36 is swung counterclockwise so as to cam the pawl outwardly to release position, the cam follower pin or rivet 60 is in the angularly disposed cam slot 62 whose angle is such that substantially free swinging movement of the seat back forwardly or rearwardly in the arc extending forwardly from its upright position is permitted, and spring-urged movement of the pawl does not result in a frictional interlock. In other words, at this time swinging movement of the seat in the forward arc is not materially opposed, although spring 70 will of course bias the pawl into engagement with the smooth peripheral surface of the ratchet.

The coil balance spring 72 is provided having one end received in a slot 74 provided in the head of the stud 30, the other end of the spring being hooked around a pin 76. The pin 76 conveniently extends through an opening in the seat back mount and has a projecting portion 78 which cooperates with radially extending abutment means 80 formed on the seat mount 10 to limit rearward swinging movement of the seat back mount 14. Similarly, the seat back mount 14 is provided with a radially projecting abutment 82 cooperable with a stop pin 84 suitably mounted on the seat mount 10. It will of course be understood that location of the abutment means may be selected to provide any desired amount of angular movement of the seat back.

Attention is particularly invited to the fact that the complete locking assembly which provides for pivotal interconnection between the seat and the seat back, is formed for the most part from flat stock which may be die cut to the required shape and dimensions. The seat back mount 14, while it is formed from flat stock, includes the partially sheared and displaced portion which provides an internally toothed pocket integral therewith. It will be noted that the cover 24 is permanently secured to the seat mount 10 by riveting and that the cylindrical heads 46 of the rivets 22 project beyond the inner side of the seat mount 10 into the pocket 18 where they constitute pivot mountings providing means for supporting the freely rotatable planet gears 44. The pawl 54 is permanently attached by the rivet 60 to the cover 24. The cam or release lever 36 is retained in assembly by ring 38. All elements are retained in the completely assembled position best illustrated in FIG. 4, essentially by the stud 30 and more particularly by the coaction between its enlarged head and the staked portion 34 which bears against the outer surface of the cover 24.

Attention is also invited to the fact that since limited movement of the seat back mount 14 provides substantial rotation of the ratchet 52, the seat back may be adjusted precisely into a required position and locked in such position.

The seat recliner assembly disclosed herein can of course be used to provide for adjustment of the seat back in either a two-door or a four-door vehicle. Where the assembly is provided for a four-door vehicle, it is not necessary to provide for swinging of the seat back forwardly from the upright position and of course, this can in fact be prevented by proper location of the motion limiting stops.

However, where the adjustable seat back is divided in a two-door vehicle, a particularly useful operation results from the provision of the smooth peripheral portion of the ratchet which is in operative position relative to the pawl while the seat back is moved from its upright position in conjunction with the balance spring. Thus, when the seat back has been left either upright or in a rearwardly tilted position by the occupant of the front seat, the occupant of the rear seat may release the pawl from the ratchet and the seat back will be swung forwardly by the balance spring beyond the upright position and to the full forward position which affords access to the rear seat. Of course, if the front seat is occupied, this forward movement of the seat back will be to a position as permitted by the occupant of the front seat. Furthermore, the occupant of the rear seat need not retain the actuating means in unlatched position but may release the actuating means as soon as the seat back has passed beyond its upright position. At this time, while the cam actuating spring 70 will tend to rotate the cam 36, this will only cause the teeth of the pawl to bear lightly against the smooth peripheral surface of the ratchet.

What we claim as our invention is:

1. Seat back adjusting mechanism comprising a seat member, a seat back member, a pivot connection between said members, planetary gearing comprising a sun gear, planet gears, and an internal ring gear connected between said members, one of said gears being driven as an incidence of pivotal movement between said members, a ratchet gear fixed to said driven gear, and a locking pawl movable on one of said members into and out of engagement with said ratchet to block said ratchet gear and thereby to lock said seat back member in adjusted position.

2. Mechanism as defined in claim 1 in which one of said members carries the internal ring gear of the planetary gearing concentric with the axis of said pivot connection, the planet gears of the planetary gearing are rotatably mounted in fixed position on said other member, and the sun gear of said planetary gearing is the driven gear and is freely rotatable about said pivot axis.

3. Mechanism as defined in claim 2 in which said members are formed from flat stock having flat slidably engaging surfaces surrounding said pivot connection, said one member having a partially sheared and laterally displaced central portion defining an internally toothed pocket forming the said internal gear of said planetary system.

4. Mechanism as defined in claim 3 in which said other member has a flat cover fixed to one side thereof surrounding said pivot connection, said planet gears being received in the pocket in said one member.

5. Mechanism as defined in claim 4, said cover being riveted to said other member, the heads of said rivets constituting bearings for said planet pinions.

6. Mechanism as defined in claim 4, said pivot connection being in the form of a stud having abutments adjacent opposite ends, one of said abutments engaging the outer surface of the laterally displaced central portion of said one member and the other abutment engaging the outer surface of said cover, said stud constituting the sole means maintaining said assembly in assembled condition.

7. Mechanism as defined in claim 1, said pivot connection being in the form of a stud having a head engaging one side of one of said members and abutment means on said stud and engaging the opposite side of said other member.

8. Seat back adjusting mechanism comprising a pair of flat frame members pivotally interconnected and having flat slidably engaged surfaces surrounding the axis of the pivot interconnection, one of said members at its side adjacent the other member having a shallow pocket, said pocket having radially inwardly extending teeth forming an internal gear, a stud pivotally interconnecting said members, a sun gear on said stud in said pocket, and planet gears in said pocket in mesh with said sun gear and said internal gear, and locking means for locking said sun gear against rotation to prevent relative pivotal movement between said frame members.

9. Mechanism as defined in claim 8 in which said locking means comprises a ratchet gear fixed to said sun gear, and a pawl having teeth interfitting with said ratchet gear and carried by one of said members for movement only in a generally radial direction into and out of mesh with the teeth of said ratchet gear.

10. Mechanism as defined in claim 9 in which said other frame member has a second pocket confronting the pocket in said one frame member, said pawl and ratchet gear being located in said second pocket, resilient means biasing said pawl toward said ratchet gear, and manually operable means for releasing said pawl.

11. Mechanism as defined in claim 10 in which said manually operable means comprises a rotary cam operatively connected to said pawl and pivotally mounted on said stud.

12. Mechanism as defined in claim 10 in which said second pocket is formed by a cover plate secured over an opening provided in said other frame member, rivets securing said cover plate in position, said rivets having generally cylindrical heads located in the pocket in said one frame member and providing rotary supports for said planet gears.

13. Mechanism as defined in claim 12, said stud having a radially slotted head engaging the side of said one member opposite said other member, means acting between said stud and said cover preventing rotation of said stud, and a coil counterbalance spring having one end fixed in the slot in the head of said stud and the other end operatively connected to one of said frame members.

14. Mechanism as defined in claim 13 in which said stud has abutment means adjacent its end remote from said head operatively connected to said other member, said stud constituting the sole means retaining said members in assembly.

15. Mechanism as defined in claim 14 in which said manually operable means includes a rotary cam pivotally mounted on the end of said stud outwardly of said other member, and detachable abutment means on said stud retaining said cam in assembly on said stud.

16. Mechanism as defined in claim 9 in which said one member is adapted to be connected to the movable seat back of the front seat of a two-door vehicle, and in which the seat back is movable from an upright position forwardly to an access position in which it affords minimum interference with access to the back seat, and rearwardly from said upright position to a multiplicity of tilted and reclining positions in which it may be latched, said ratchet having a toothed peripheral portion cooperable with said pawl while said seat back is in upright position or rearwardly thereof and a smooth peripheral portion cooperable with said pawl when said seat back is forwardly of upright position.

17. Mechanism as defined in claim 16 comprising an actuating cam pivoted to said stud, an inclined cam surface on said cam, a follower connected to said pawl and slidable on said cam surface, the inclination of said cam surface being such that when said pawl engages teeth in said ratchet, forces applied from the seat back to said gearing are ineffective to release said pawl.

18. Mechanism as defined in claim 17 comprising a spring connected to said cam urging it in a direction to force said pawl toward said ratchet, the inclination of the portion of said cam engaged by said follower while said pawl engages the smooth peripheral surface of said ratchet is such that said spring applies only a light frictional force to said cam.

19. Mechanism as defined in claim 18 comprising a balance spring connected to the member connected to the seat back and effective to move the seat back forwardly to limiting access position when the pawl and ratchet latch is disengaged, the frictional force applied by the pawl to the smooth peripheral surface of the ratchet being insufficient to prevent movement of the seat back to the forward access position by said balance spring.

* * * * *